United States Patent
Vargantwar (10) Patent No.: US 8,625,447 B1
(45) Date of Patent: Jan. 7, 2014

(54) OVERHEAD MESSAGE VERSION UPDATE BASED ON DISTRIBUTION OF DEVICES

(75) Inventor: Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

(21) Appl. No.: 13/018,654

(22) Filed: Feb. 1, 2011

(51) Int. Cl.
*H04L 12/28* (2006.01)
*H04W 4/00* (2009.01)

(52) U.S. Cl.
USPC ......... 370/252; 370/328; 370/392; 455/432.2

(58) Field of Classification Search
None
See application file for complete search history.

(56) References Cited

U.S. PATENT DOCUMENTS

| | | | |
|---|---|---|---|
| 6,985,534 B1 * | 1/2006 | Meister | 375/260 |
| 7,453,851 B2 | 11/2008 | Westphal et al. | |
| 7,483,699 B2 * | 1/2009 | Karmi et al. | 455/432.2 |
| 7,729,696 B2 | 6/2010 | Harris et al. | |
| 7,852,810 B1 * | 12/2010 | Talley et al. | 370/333 |
| 8,194,562 B1 * | 6/2012 | Gandhi et al. | 370/252 |
| 2004/0008689 A1 | 1/2004 | Westphal et al. | |
| 2004/0228349 A1 * | 11/2004 | Vrzic et al. | 370/395.4 |
| 2008/0057906 A1 | 3/2008 | Lee et al. | |
| 2008/0186923 A1 | 8/2008 | Westphal et al. | |

* cited by examiner

Primary Examiner — Melanie Jagannathan (57) ABSTRACT

A communication transceiver transmits an overhead message including a version number associated with a first version of the overhead message. A processing system determines control channel occupancy and reverse noise generated by a plurality of wireless communication devices, compares the control channel occupancy to an occupancy threshold and the reverse noise to a reverse noise threshold, and updates the version number resulting in an updated version number if a criteria is met. The criteria is met if the control channel occupancy fails to exceed the occupancy threshold and the reverse noise exceeds the reverse noise threshold. The communication transceiver then transmits the overhead message including the updated version number if the criteria is met.

20 Claims, 10 Drawing Sheets

| TIME | OH MESSAGE | OH VERSION NO. | OH APM | OH SPM | WCD1 VERSION NO. | WCD1 APM | WCD1 SPM | |
|---|---|---|---|---|---|---|---|---|
| T0 | M1 | 10010011 | A | B | 10010011 | A | B | |
| T1 |   |   |   |   | 10010011 | A | B | NO UPDATE |
| T2 | M1 | 10010011 | A | B | 10010011 | A | B | |
| T3 |   |   |   |   | 10010011 | A | B | NO UPDATE |
| T4 | M1 | 10010011 | A | B | 10010011 | A | B | |
| T4 |   |   |   |   | 10010011 | A | B | NO UPDATE |

FIGURE 6A

| TIME | OH MESSAGE | OH VERSION NO. | OH APM | OH SPM | WCD7 VERSION NO. | WCD7 APM | WCD7 SPM | |
|---|---|---|---|---|---|---|---|---|
| T0 | M1 | 10010011 | A | B | 10010011 | A | B | |
| T1 |   |   |   |   | 10010011 | A | B | NO UPDATE |
| T2 | M2 | 10001111 | Z | W | 10010011 | A | B | |
| T3 |   |   |   |   | 10010011 | Z | B | PARTIAL UPDATE: APM ONLY |
| T4 | M1 | 10010011 | A | B | 10010011 | Z | B | |
| T5 |   |   |   |   | 10010011 | Z | B | NO UPDATE |

| TIME | OH MESSAGE | OH VERSION NO. | OH APM | OH SPM | WCD1 VERSION NO. | WCD1 APM | WCD1 SPM | |
|---|---|---|---|---|---|---|---|---|
| T0 | M1 | 10010011 | A | B | 10010011 | A | B | |
| T1 | | | | | 10010011 | A | B | ← NO UPDATE |
| T2 | M1 | 10010011 | A | B | 10010011 | A | B | |
| T3 | | | | | 10010011 | A | B | ← NO UPDATE |
| T4 | M1 | 10010111 | A | B | 10010011 | A | B | |
| T5 | | | | | 10010111 | A | B | ← UPDATE |

FIGURE 8A

| TIME | OH MESSAGE | OH VERSION NO. | OH APM | OH SPM | WCD7 VERSION NO. | WCD7 APM | WCD7 SPM | |
|---|---|---|---|---|---|---|---|---|
| T0 | M1 | 10010011 | A | B | 10010011 | A | B | |
| T1 | | | | | 10010011 | A | B | ← NO UPDATE |
| T2 | M2 | 10001111 | Z | W | 10010011 | A | B | |
| T3 | | | | | 10010011 | Z | B | ← PARTIAL UPDATE: APM ONLY |
| T4 | M1 | 10010111 | A | B | 10010011 | Z | B | |
| T5 | M1 | | | | 10010111 | A | B | ← UPDATE |

OVERHEAD MESSAGE VERSION UPDATE BASED ON DISTRIBUTION OF DEVICES

TECHNICAL BACKGROUND

Wireless communications have become increasingly prominent for sending and receiving information. For example, individuals may utilize a wireless communication device for voice communications, research, entertainment, or for conducting critical business transactions. To support these services, a wireless communication network may perform communications via forward-link communication channels and reverse-link communication channels. Forward-link communication channels typically carry communications from a wireless access network to wireless communication devices, while the reverse-link communication channels transfer communications from the wireless communication devices to the network. The forward-link channels may include data and control channels. The control channels may include pilot channels, sync channels, and paging channels. The data channels may include forward traffic channels.

Typically, the paging channels are used by the wireless access network to notify wireless communication devices when a request to communicate has been received. The paging channels are also used to transmit overhead messages and paging messages. A paging message is a short data message sent over the control channel to communicate information to a wireless communication device. Common pages include incoming call alerts, voice mail indicators, text messages, location requests, and data session requests. Conversely, overhead messages are not addressed to any specific wireless communication device. Instead, the overhead messages are intended for distribution to each mobile unit within a coverage area.

The overhead messages are typically received and processed by a wireless communication device when the wireless communication device is in an "idle state," (i.e., the device is not engaged in a call or attempting to engage in a call). While in the idle state, a wireless communication device periodically wakes up and listens to the paging channel in order to receive the overhead messages. Because the overhead messages often remain the same for substantial periods of time, a version number may be transmitted along with the overhead message allowing the wireless communication device to wake up, receive the version number, and stay awake to decode the overhead message only if the overhead message has changed.

Overview

A communication transceiver transmits an overhead message including a version number associated with a first version of the overhead message. A processing system determines control channel occupancy and reverse noise generated by a plurality of wireless communication devices, compares the control channel occupancy to an occupancy threshold and the reverse noise to a reverse noise threshold, and updates the version number resulting in an updated version number if a criteria is met. The criteria is met if the control channel occupancy fails to exceed the occupancy threshold and the reverse noise exceeds the reverse noise threshold. The communication transceiver then transmits the overhead message including the updated version number if the criteria is met.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
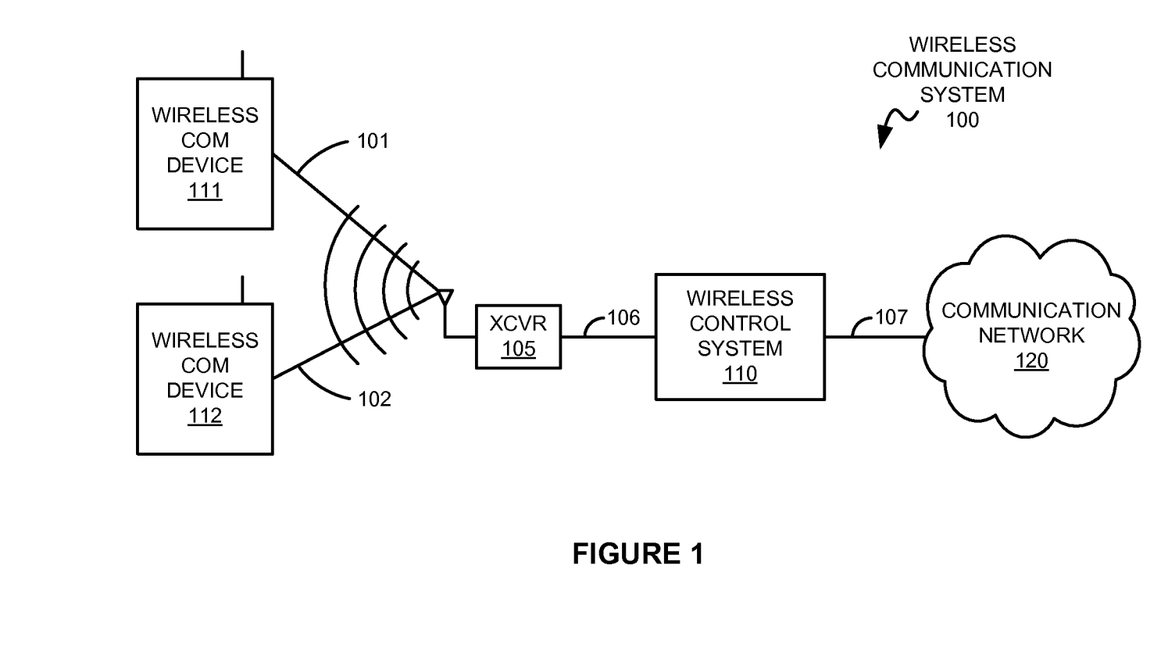
FIG. 1 illustrates a wireless communication system.

FIG. 1 illustrates wireless communication system 100. Wireless communication system 100 comprises wireless communication devices 111 and 112, transceiver 105, wireless control system 110, and communication network 120. Transceiver 105 and wireless communication devices 111 and 112 are in communication over wireless links 101 and 102, respectively. Transceiver 105 and wireless control system 110 are in communication over communication link 106. Wireless control system 110 and control system 120 are in communication over communication link 107. In this example, two wireless communication devices are shown for simplicity. More or fewer wireless communication devices may be included in wireless communication system 100.

In operation, wireless control system 110 transmits an overhead message to transceiver 105, which in turn, transmits the overhead message to wireless communication devices 111 and 112. The overhead message includes a version number that indicates the current version of the overhead message. Upon reception of the overhead message, wireless communication devices 111 and 112 compare the version number with the last version number received to determine if the version is different from a previously received version number. If the version is different, wireless communication devices 111 and 112 replace existing internal communication data (i.e., communication data contained in the previously received overhead message) with the communication data contained in the received overhead message (i.e., communication data contained in the current overhead message). However, if the version is the same as the previously received version number, wireless communication devices 111 and 112 ignore the communication data contained in the received overhead message.

Wireless control system 110 determines control channel occupancy and reverse noise generated by wireless communication devices 111 and 112, and compares the reverse noise to a noise threshold and the control channel occupancy to an occupancy threshold. If the reverse noise exceeds the reverse noise threshold and the control channel occupancy fails to exceed the occupancy threshold then wireless control system 110 updates the version number and transmits the updated overhead message to wireless communication devices 111 and 112.

Once received, wireless communication devices 111 and 112 compare the updated version number to the existing version number. In this case, the updated version number is not equivalent to the existing version number, and thus wireless communication devices 111 and 112 replace their existing internal communication data with communication data contained in the overhead message.

Figure 2:
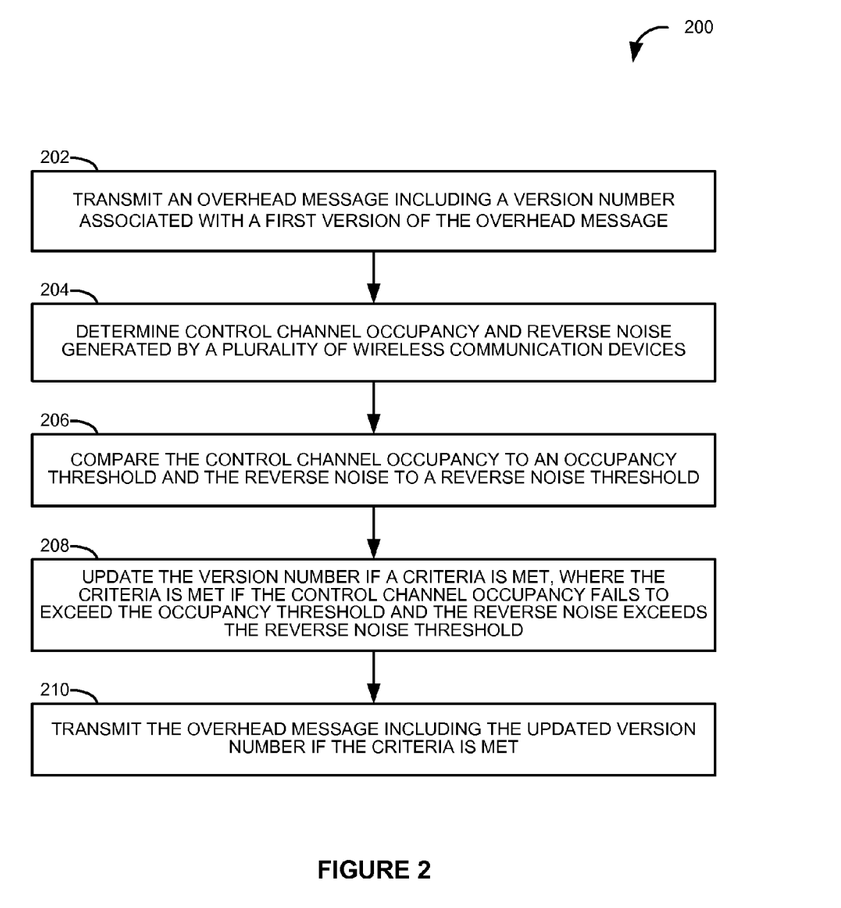
FIG. 2 illustrates the operation of a wireless control system in a wireless communication system.

FIG. 2 illustrates the operation of wireless control system 110 in wireless communication system 100. Wireless control system 110 transmits an overhead message including a version number associated with a first version of the overhead message (202). The overhead message may be transmitted over a paging channel and contain information that enables wireless communication devices 111 and/or 112 to communicate with wireless control system 110. In some examples, the overhead messages may comprise system parameters, access parameters, channel lists, and/or neighbor lists. For example, the overhead message may comprise access parameters messages (APM) and/or a sector parameters messages (SPM).

Wireless control system 110 determines the control channel occupancy and reverse noise generated by wireless communication devices 111 and 112 (204). The control channel occupancy may indicate a loading metric or an amount of utilization of the control channel. The reverse noise may indicate noise generated by any number of wireless communication devices. In some examples, the reverse noise comprises noise generated by wireless communication devices 111 and 112. In other examples, the reverse noise may comprise noise generated by wireless communication devices 111 and 112 and noise generated by other wireless communication devices (not shown) located both in and out of the sector or coverage area.

Wireless control system 110 then compares the control channel occupancy to an occupancy threshold and the reverse noise to a noise threshold (206). In some examples, the loading metric or amount of utilization of the control channel may be compared to an occupancy threshold value, in which case the amount of utilization could be measured in or converted to compatible units with the applicable occupancy threshold. Likewise, the reverse noise may be compared to a reverse noise threshold value resulting in the reverse noise being measured in or converted to compatible units with the reverse noise threshold. Wireless control system 110 then updates the version number if a criteria is met, wherein the criteria is met if the control channel occupancy fails to exceed the occupancy threshold and the reverse noise exceeds the reverse noise threshold (208). Wireless control system 110 then transmits the overhead message including the updated version number if the criteria is met (210).

Figure 3:
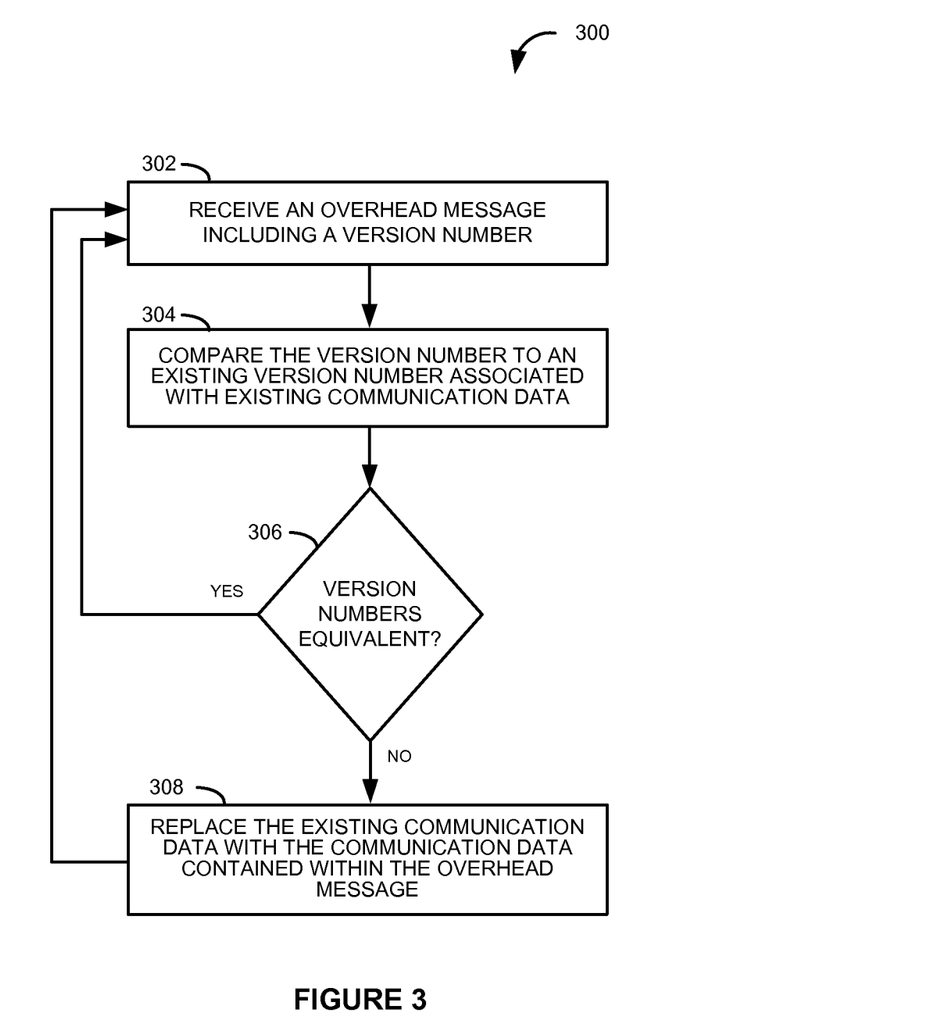
FIG. 3 illustrates the operation of a wireless communication device in a wireless communication system.

FIG. 3 illustrates the operation of wireless communication device 111 in wireless communication system 100. The following description could also describe operation of wireless communication device 112. To begin, wireless communication device 111 receives an overhead message including a version number (302). The overhead message may be received over a paging channel and contain information that enable wireless communication device 111 to communicate with wireless control system 110. As discussed above, the overhead message may comprise messages including an APM and/or an SPM.

Wireless communication device 111 compares the received version number to an existing version number associated with existing communication data (304). In this example, the existing version number may be a previously received version number stored in memory by wireless communication device 111 which is associated with existing communication data from a previously received overhead message.

If the version numbers are equivalent then wireless communication device 111 does not replace its existing communication data with the communication data contained within the currently received overhead message (306). Conversely, if the version numbers are not equivalent, wireless communication device 111 replaces the existing communication data with the communication data contained in the currently received overhead message (308).

Figure 4:
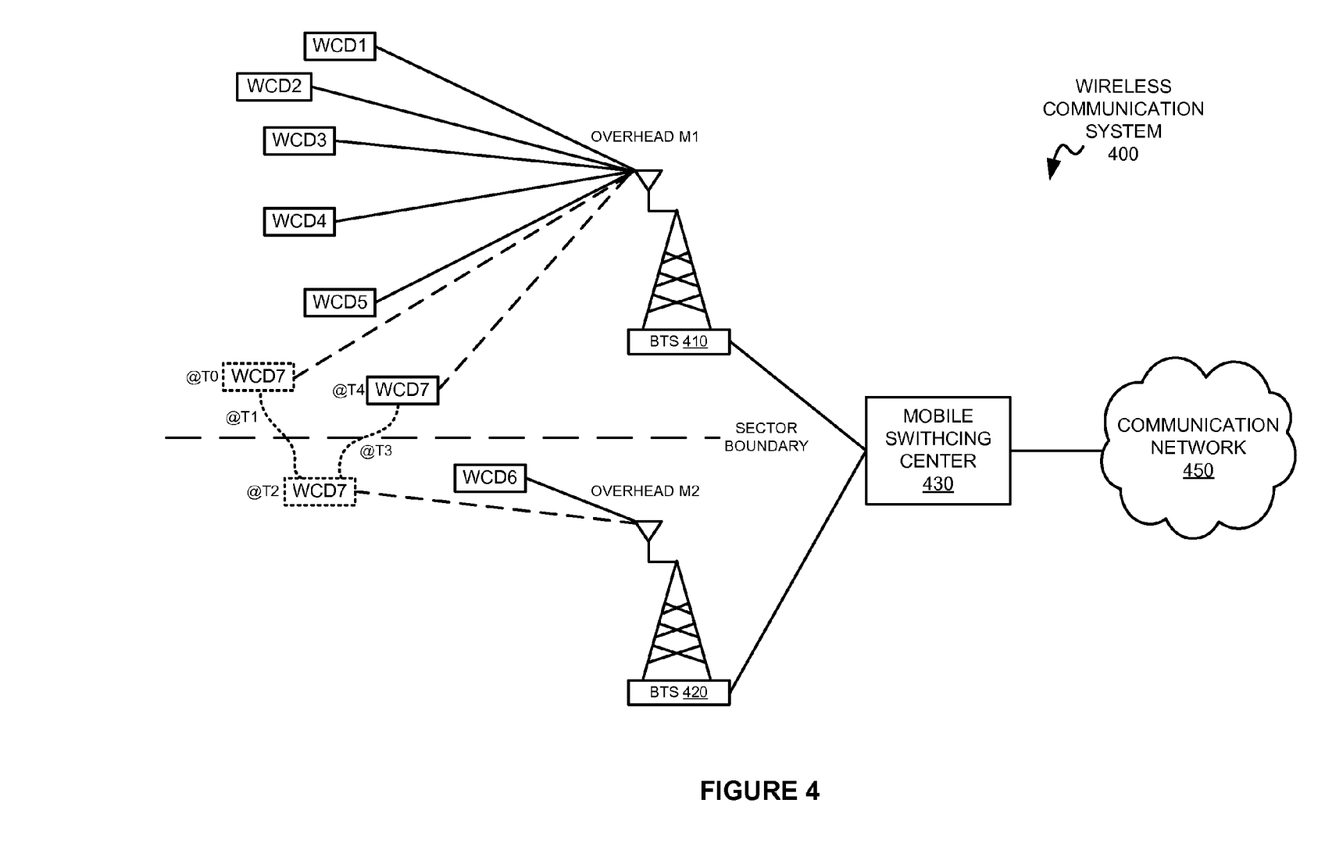
FIG. 4 illustrates a wireless communication system.

FIG. 4 illustrates wireless communication system 400. In this example, wireless communication system 400 comprises wireless communication devices WCD1-WCD7, base stations BTS 410 and BTS 420, a mobile switching center (MSC) 420, and a communication network 450. Each wireless communication device is shown with a link to a base station. In this example, the links comprise forward communications links.

The forward communication links may include one or more data channels, a pilot channel, and one or more paging channels, all of which are transmitted from each of the base stations to the wireless communication devices. The pilot channel or pilot signal may serve to define the boundaries of the cell or sector area served by a base station. Moreover, in some instances the pilot signal may also provide for time reference and for amplitude and phase tracking and allows wireless communication devices to identify and become synchronized with the various base stations that are within range of their communication capability. In this example, a single sector boundary crossing is shown for simplicity.

As shown, BTS 410 includes a transceiver configured to communicate a first overhead message M1 for delivery to wireless communication devices located within a first sector or coverage area (i.e., the coverage area of BTS 410). Overhead message M1 may be transmitted over a paging channel and contain information that enables wireless communication devices within the first sector to communicate with BTS 410, and thereby with the communication network. Likewise BTS 420 includes a transceiver configured to communicate a second overhead message M2 for delivery to wireless communication devices located within a second sector or coverage area (i.e., the coverage area of BTS 420). Overhead message M2 may be transmitted over a paging channel and contain information that enables wireless communication devices within the second sector to communicate with BTS 420, and thereby with the communication network.

Overhead messages M1 and M2 include version numbers associated with the current version of the transmitted overhead message. In some examples, the version number may comprise one or more signatures in signature fields. Each signature field may include a modulo count. For example, a modulo count may be included for the version number or signature of the APM. Likewise, a second modulo count may be included for the version number or signature of the SPM. The modulo count is typically increased or updated each time that the value of the APM or SPM changes. Wireless communication devices periodically read the signature fields to see if the APM and SPM messages have been updated.

Wireless communication devices WCD1-WCD5 are located within the first sector, wireless communication device WCD6 is located within the second sector, and wireless communication device WCD7 moves between the first and second sectors. For instance, at time T0 WCD7 is located in the first sector; at time T1 WCD7 moves from the first sector to the second sector; at time T3 WCD7 is located in the second sector; at time T4 WCD moves from the second sector to the first sector; and at time T5 WCD7 is located in the first sector. Time T0 is an arbitrary point in time and not necessarily a specific or an initial point in time.

Figure 5A:
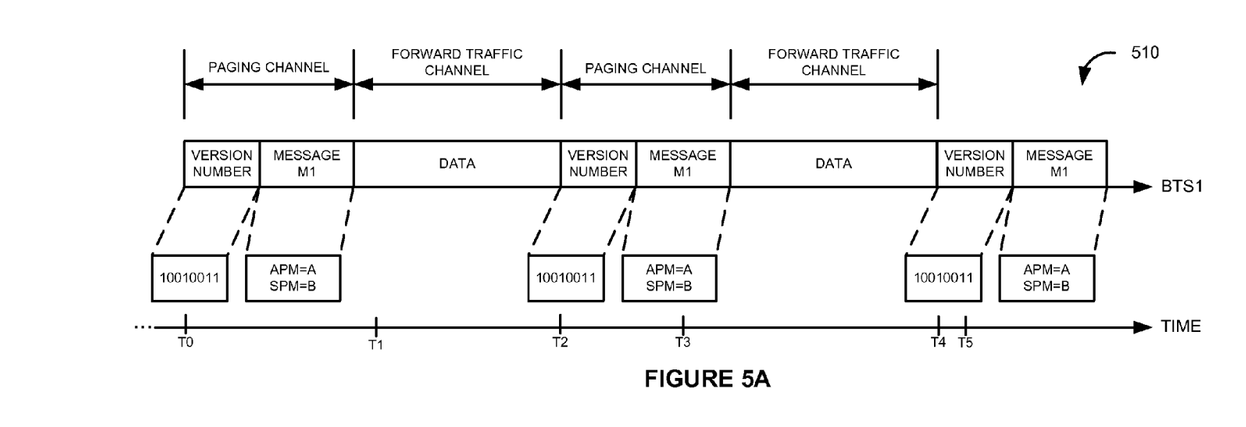
FIGS. 5A and 5B illustrate forward paging channels in a wireless communication system.
Figure 5B:
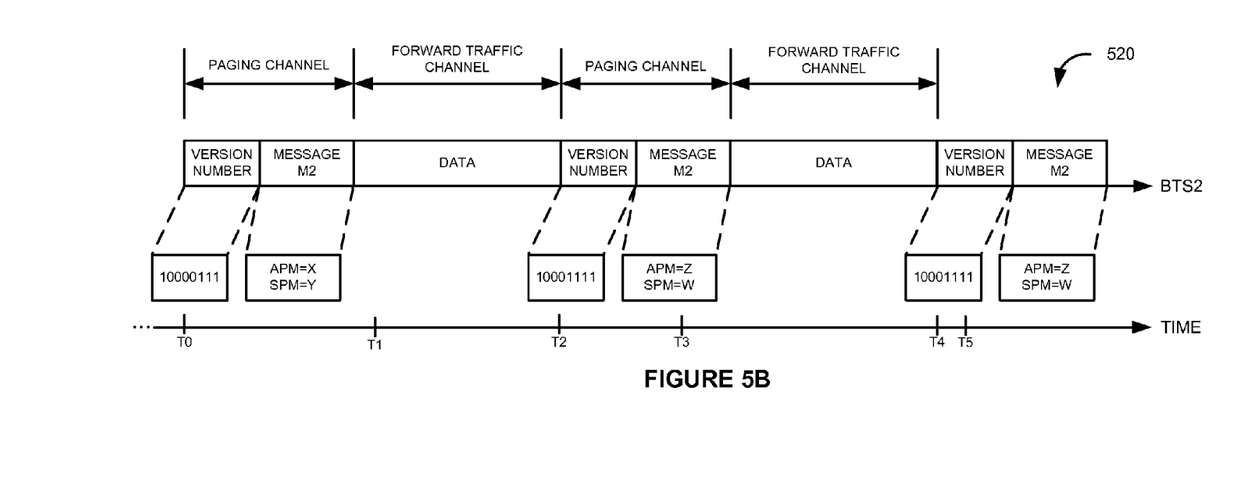

FIGS. 5A and 5B illustrate forward communication links associated with base stations BTS 410 and BTS 420 of FIG. 4, respectively, according to an example of operation. In this example, each forward communication link comprises a periodic cycle of a data stream transmitted from the base station to the wireless communication devices within range. The forward communication link includes a paging channel and a forward traffic (or data) channel. The paging channel includes a version number capsule and an overhead message capsule. The version number capsule contains at least one version number. In this example, a single version number representing a group of overhead messages (i.e., APM and SPM) is shown. However, multiple version numbers may be included in each capsule. If multiple version numbers are included in each capsule, each version number may represent one or more overhead messages.

The overhead message capsule includes at least one overhead message. As previously discussed, the overhead messages are not addressed to any specific wireless communication device but are intended for distribution to each wireless communication device within the corresponding sector or coverage area. Possible overhead messages include, but are not limited to, system parameters, access parameters, channel lists, and neighbor lists. Other overhead message may include any type of parameters used to establish and maintain communication between a wireless communication device and a base station or wireless access point.

Overhead messages are received and processed by wireless communication devices within range of the base station. Typically, the wireless communication device is in an "idle state" or low power state when not in use. During the idle state, the wireless communication device periodically wakes up and listens to the paging channel and processes messages on that paging channel. The base station transmits the overhead message including the version number allowing the wireless communication device to process the version number and go back into the "idle state" without replacing the existing communication data such as, for example, the existing APM and/or the existing SPM.

Referring first to FIG. 5A, which illustrates forward communication link 510 according to one example of operation. As shown, forward communication link 510 includes three cycles of the paging channel and two cycles of the forward traffic channel transmitted from based station BTS 410. At time T0, BTS 410 begins transmission of the overhead message M1 in the first paging channel. Time T0 is simply a reference point and not necessarily a specific point in time or the first time that BTS 410 is in communication with wireless communication devices in the sector.

The first paging cycle includes a version number capsule and an overhead message capsule. In this example, the version number capsule comprises a version number indicating the modulo count "10010011" and the overhead message capsule comprises an APM indicating the value "A" and an SPM indicating the value "B." The values "A" and "B" are symbolic message values, actual APM and SPM values are used by the wireless communication device to initiate communication with the base station.

Typically, whenever the APM or the SPM changes, the version number modulo count will be updated or incremented by the base station and then transmitted during the following paging channel cycle. The updated version number modulo count is then received by the wireless communication device when it wakes up from the "idle state." The wireless communication device processes the received version number and recognizes that the version number modulo count is updated. Accordingly, the wireless communication device replaces the existing APM and SPM with the received APM and SPM associated with the updated version number.

The first forward traffic channel follows the first paging cycle. The first forward traffic channel carries data associated with the various communication sessions to the individual wireless communication devices. The second paging cycle follows the first forward traffic channel. The second paging cycle includes a version number capsule and an overhead message capsule. In this example, the version number does not change, and thus the capsule comprises a version number indicating the modulo count "10010011." Likewise, the overhead message capsule comprises an APM indicating the value "A" and an SPM indicating the value "B."

The second forward traffic channel follows the second paging cycle. The second forward traffic carries data associated with the various communication sessions to the individual wireless communication devices. The third paging cycle follows the second forward traffic channel. The third paging cycle includes a version number capsule and an overhead message capsule. In this example, again, the version number does not change, and thus the capsule comprises a version number indicating the modulo count "10010011," the overhead message capsule comprises an APM indicating the value "A," and an SPM indicating the value "B."

Referring now to FIG. 5B, which illustrates forward communication link 520 according to one example of operation. As shown, forward communication link 520 includes three cycles of the paging channel and two cycles of the forward traffic channel transmitted from based station BTS 420. At time T0, BTS 420 begins transmission of the overhead message M2 in the first paging channel. Time T0 is simply a reference point and not necessarily a specific point in time or the first time that BTS 420 is in communication with wireless communication devices in the sector.

The first paging cycle includes a version number capsule and an overhead message capsule. In this example, the version number capsule comprises a version number indicating the modulo count "10000111" and the overhead message capsule comprises an APM indicating the value "X" and an SPM indicating the value "Y." The values "X" and "Y" are symbolic message values, actual APM and SPM values are used by the wireless communication device to initiate communication with the base station.

The first forward traffic channel follows the first paging cycle. The first forward traffic channel carries data associated with the various communication sessions to the individual wireless communication devices. The second paging cycle follows the first forward traffic channel. The second paging cycle includes a version number capsule and an overhead message capsule. In the second paging cycle, base station BTS 420 has updated the version number because the APM and SPM values changed. In this example, the version number capsule comprises a version number indicating the modulo count "10001111" and the overhead message capsule comprises an APM indicating the value "Z" and an SPM indicating the value "W."

The second forward traffic channel follows the second paging cycle. The second forward traffic carries data associated with the various communication sessions to the individual wireless communication devices. The third paging cycle follows the second forward traffic channel. The third paging cycle includes a version number capsule and an overhead message capsule. In this example, the version number does not change in the third paging cycle, and thus the capsule again comprises a version number indicating the modulo count "10001111," the overhead message capsule comprises an APM indicating the value "Z," and an SPM indicating the value "W."

Figure 6A:
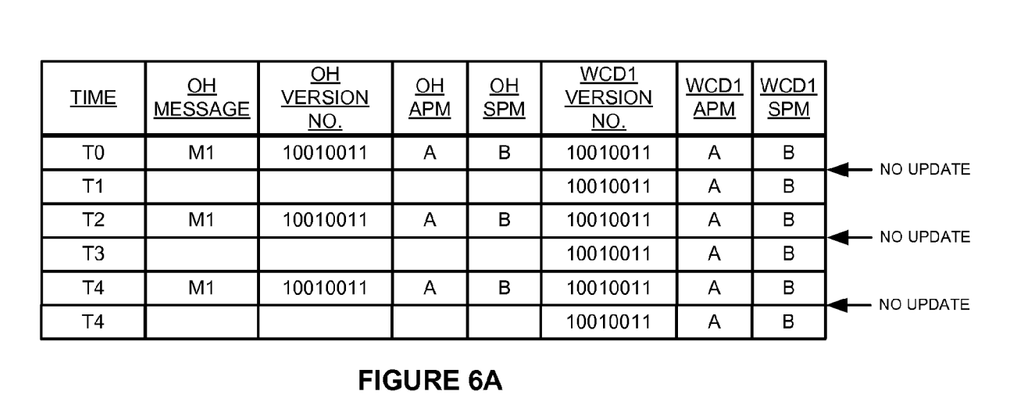
FIGS. 6A and 6B illustrate operation of wireless communication devices in a wireless communication system
Figure 6B:
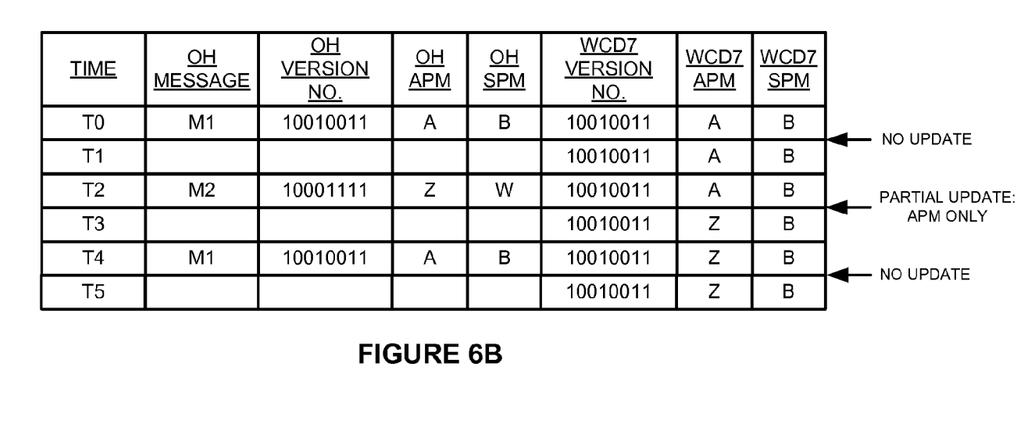

FIGS. 6A and 6B illustrate operation of WCD1 and WCD7 in wireless communication system 400. In particular, FIG. 6A illustrates reception of forward communication link 510 as seen from WCD1. Similarly, FIG. 6B illustrates reception of the forward communication links 510 and 520 as seen from WCD7. For clarity of discussion, no time elapses between the transmission of information on the forward communication channels from the base stations to the reception of that information at the wireless communication devices.

As shown, FIG. 6A comprises a first column labeled TIME and remaining columns from left to right labeled OH MESSAGE, OH VERSION NO., OH APM, OH SPM, WCD1 VERSION NO., WCD1 APM, and WCD1 SPM. Each row represents the currently transmitted overhead message and the existing overhead message information stored in WCD1. For example, at time T0 overhead message M1 is received by WCD1 including the version number "10010011," an APM set to "A," and an SPM set to "B." The existing overhead message information stored in WCD1 (i.e., WCD1 VERSION NO.) indicates a version number "10010011." Thus, at time T0 WCD1 wakes up from an "idle state" reads the OH VERSION NO. "10010011," compares the OH VERSION NO. to the WCD1 VERSION NO., determines the version numbers to be equivalent, and returns to an idle state without updating WCD1 APM, WCD1 SPM, or WCD1 VERSION NO. This process is repeated at times T2 and T4 as overhead message M1 remains unchanged.

FIG. 6B illustrates reception of the forward communication links 510 and 520 as seen from WCD7. Specifically, FIG. 6B illustrates a communication failure caused by a partial overhead message update. As discussed above, from time T0 to time T5 WCD7 moves from the first sector to the second sector and back to the first sector. In particular, at time T0 overhead message M1 is received by WCD7 including the version number "10010011," an APM set to "A," and an SPM set to "B." The existing overhead message information stored in WCD7 (i.e., WCD7 VERSION NO.) indicates a version number "10010011." Thus, at time T0 WCD7 wakes up from an "idle state" reads the OH VERSION NO. "10010011," compares the OH VERSION NO. to the WCD7 VERSION NO., determines the version numbers to be equivalent, and returns to an idle state without updating WCD1 APM, WCD1 SPM, or WCD1 VERSION NO.

At time T1 WCD7 moves from the first sector to the second sector. At time T2 overhead message M2 is received by WCD7 including the version number "10001111," an APM set to "Z," and an SPM set to "W." The existing overhead message information stored in WCD7 (i.e., WCD7 VERSION NO.) indicates a version number "10010011." Thus, at time T3 WCD7 wakes up from an "idle state" reads the OH VERSION NO. "100001111," compares the OH VERSION NO. to the WCD7 VERSION NO., determines the version numbers to not be equivalent, and remains awake in order to update WCD7 APM, WCD7 SPM, an WCD7 VERSION NO. However, at time T3, prior to updating WCD7 SPM and WCD7 VERSION NO., WCD7 moves from the second sector back to the first sector. Thus, at time T3, the existing overhead message information stored in WCD7 (i.e., WCD7 VERSION NO.) indicates a version number "10010011," the WCD7 APM is set to "Z," and the WCD7 SPM is set to "B."

At time T4 WCD7 overhead message M1 is received by WCD7 including the version number "10010011," an APM set to "A," and an SPM set to "B." Thus, at time T4 WCD7 wakes up from an "idle state" reads the OH VERSION NO. "10010011," compares the OH VERSION NO. to the WCD7 VERSION NO., determines the version numbers to be equivalent, and returns to an idle state without updating WCD7 APM, WCD71 SPM, or WCD7 VERSION NO. Accordingly, at time T5 and beyond WCD7 is unable to communicate with the base station because the WCD7 APM is incorrect.

Figure 7A:
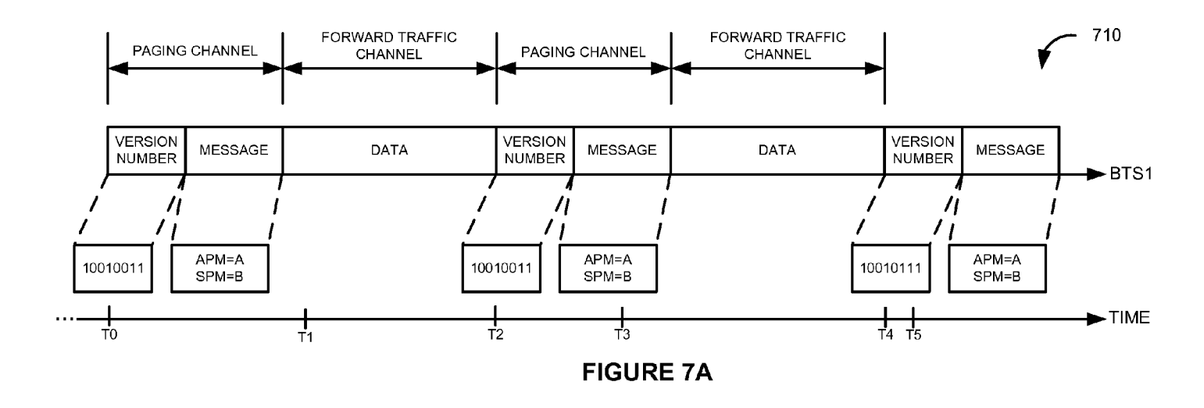
FIGS. 7A and 7B illustrate a forward paging channels in a wireless communication system.
Figure 7B:
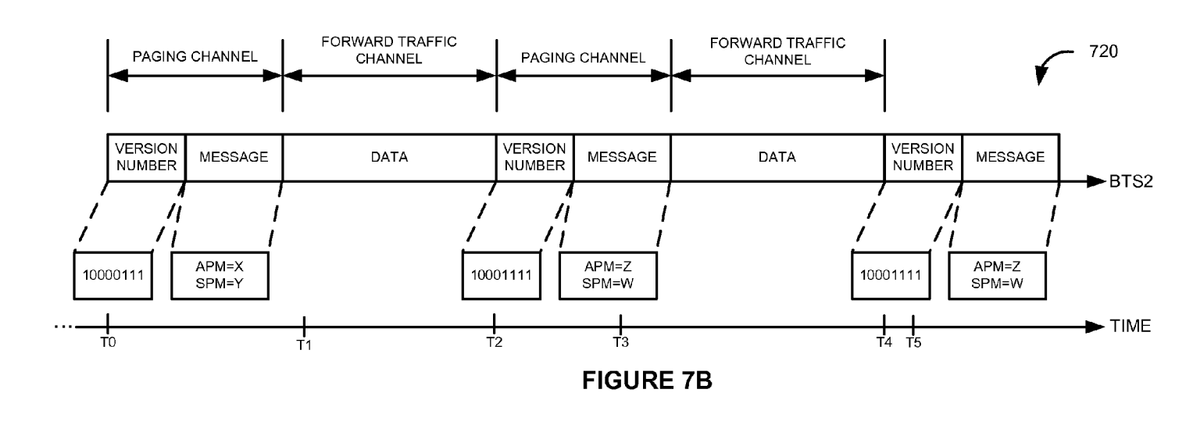

FIGS. 7A and 7B illustrate forward communication links associated with base stations BTS 410 and BTS 420 of FIG. 4, respectively, according to another example of operation. Referring first to FIG. 7A, which illustrates forward communication link 710 according to another example of operation. As shown, forward communication link 710 includes three cycles of the paging channel and two cycles of the forward traffic channel transmitted from based station BTS 410. At time T0, BTS 410 begins transmission of the overhead message M1 in the first paging channel. Time T0 is simply a reference point and not necessarily a specific point in time or the first time that BTS 410 is in communication with wireless communication devices in the sector.

The first paging cycle includes a version number capsule and an overhead message capsule. In this example, the version number capsule comprises a version number indicating the modulo count "10010011" and the overhead message capsule comprises an APM indicating the value "A" and an SPM indicating the value "B." The values "A" and "B" are symbolic message values, actual APM and SPM values are used by the wireless communication device to initiate communication with the base station.

The first forward traffic channel follows the first paging cycle. The first forward traffic channel carries data associated with the various communication sessions to the individual wireless communication devices. The second paging cycle follows the first forward traffic channel. The second paging cycle includes a version number capsule and an overhead message capsule. In this example, the version number does not change, and thus the capsule comprises a version number indicating the modulo count "10010011." Likewise, the overhead message capsule comprises an APM indicating the value "A" and an SPM indicating the value "B."

The second forward traffic channel follows the second paging cycle. The second forward traffic carries data associated with the various communication sessions to the individual wireless communication devices. The third paging cycle follows the second forward traffic channel. The third paging cycle includes a version number capsule and an overhead message capsule. In this example, the version number is updated or incremented regardless of whether the overhead message changed in order to prevent the scenario discussed in FIG. 6B.

The version number may be updated or incremented in any number of ways. For example, base station BTS 410 may update or increment the version number based on a distribution of wireless communication devices. In this case, BTS 410 determines the control channel occupancy and reverse noise generated by wireless communication devices.

The control channel occupancy may indicate a loading metric or an amount of utilization of the control channel. The reverse noise may indicate noise generated by any number of wireless communication devices. In some examples, the reverse noise comprises noise generated by wireless communication devices located within communication range of BTS 410. The communication devices may be within the sector or coverage area. Alternatively, the reverse noise may comprise noise generated by wireless communication devices both within and outside of the sector or coverage area.

BTS 410 may then compare the control channel occupancy to an occupancy threshold and the reverse noise to a noise threshold. In some examples, the loading metric or amount of utilization of the control channel may be compared to an occupancy threshold value, in which case the amount of utilization could be measured in or converted to compatible units with the applicable occupancy threshold. Likewise, the reverse noise may be compared to a reverse noise threshold value resulting in the reverse noise being measured in or converted to compatible units with the reverse noise threshold. BTS 410 then updates the version number if the control channel occupancy fails to exceed the occupancy threshold and the reverse noise exceeds the reverse noise threshold.

The version number may also be updated or incremented by a wireless communication device. For example, the wireless communication device may disable version number verification if the wireless communication device experiences an idle handoff. The idle handoff condition occurs when the wireless communication device moves from a first sector to a second sector while in an "idle state." The wireless communication device may include a verification disable module that monitors for an idle handoff condition and ensures that the wireless communication device receive the next overhead message and update existing overhead information with the overhead information contained in the next overhead message.

The verification disable module may disable version verification or ensure that the next overhead message is received in any number of ways. For example, the wireless communication device may simply disable version number verification so that the wireless communication device does not check the version number of the next one or more overhead messages, and thus stays awake to receive the overhead messages regardless of the version number. Alternatively, the wireless communication device may modify or alter one or more bits of the existing version number in the wireless communication device. In this case, the altered version number will likely not be equivalent to the received version number, and thus the wireless communication device will stay awake to receive the overhead message and replace existing communication data with communication data contained within the received overhead message.

Referring now to FIG. 7B, which illustrates forward communication link 720 according to another example of operation. As shown, forward communication link 720 includes three cycles of the paging channel and two cycles of the forward traffic channel transmitted from based station BTS 420. At time T0, BTS 410 begins transmission of the overhead message M2 in the first paging channel. Time T0 is simply a reference point and not necessarily a specific point in time or the first time that BTS 420 is in communication with wireless communication devices in the sector.

The first paging cycle includes a version number capsule and an overhead message capsule. In this example, the version number capsule comprises a version number indicating the modulo count "10000111" and the overhead message capsule comprises an APM indicating the value "X" and an SPM indicating the value "Y." The values "X" and "Y" are symbolic message values, actual APM and SPM values are used by the wireless communication device to initiate communication with the base station.

The first forward traffic channel follows the first paging cycle. The first forward traffic channel carries data associated with the various communication sessions to the individual wireless communication devices in the second sector. The second paging cycle follows the first forward traffic channel. The second paging cycle includes a version number capsule and an overhead message capsule. In this example, the version number is updated or incremented by BTS 420 to reflect a changed or modified overhead message. Specifically, the version number capsule comprises a version number indicating the modulo count "10001111" and the overhead message capsule comprises an APM indicating the value "Z" and an SPM indicating the value "W."

The second forward traffic channel follows the second paging cycle. The second forward traffic carries data associated with the various communication sessions to the individual wireless communication devices. The third paging cycle follows the second forward traffic channel. The third paging cycle includes a version number capsule and an overhead message capsule. In this example, the version number does not change, and thus the capsule comprises a version number indicating the modulo count "10001111." Likewise, the overhead message capsule comprises an APM indicating the value "Z" and an SPM indicating the value "W."

Figure 8A:
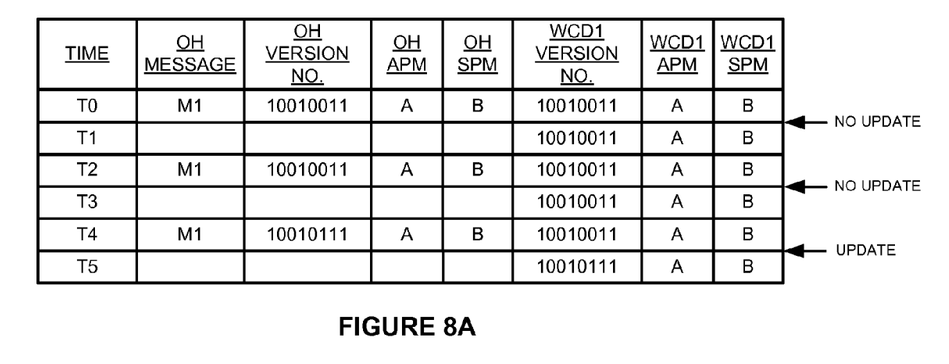
FIGS. 8A and 8B illustrate operation of wireless communication devices in a wireless communication system
Figure 8B:
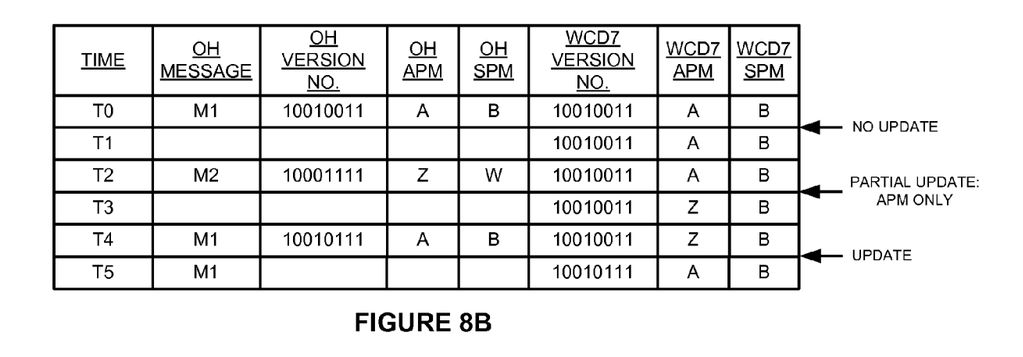

FIGS. 8A and 8B illustrate operation WCD1 and WCD7 in wireless communication system 400. In particular, FIG. 8A illustrates reception of forward communication link 710 as seen from WCD1. Similarly, FIG. 8B illustrates reception of the forward communication links 710 and 720 as seen from WCD7. For clarity of discussion, no time elapses between the transmission of information on the forward communication channels from the base stations to the reception of that information at the wireless communication devices.

As shown, FIG. 8A comprises a first column labeled TIME and remaining columns from left to right labeled OH MESSAGE, OH VERSION NO., OH APM, OH SPM, WCD1 VERSION NO., WCD1 APM, and WCD1 SPM. Each row represents the currently transmitted overhead message and the existing overhead message information stored in WCD1. For example, at time T0 overhead message M1 is received by WCD1 including the version number "10010011," an APM set to "A," and an SPM set to "B." The existing overhead message information stored in WCD1 (i.e., WCD1 VERSION NO.) indicates a version number "10010011." Thus, at time T0 WCD1 wakes up from an "idle state" reads the OH VERSION NO. "10010011," compares the OH VERSION NO. to the WCD1 VERSION NO., determines the version numbers to be equivalent, and returns to an idle state without updating WCD1 APM, WCD1 SPM, or WCD1 VERSION NO. This process is repeated at time T2 as overhead message M1 remains unchanged.

At time T4 overhead message M1 is again received by WCD1 including an updated version number set to "10010111." In this example, base station BTS 410 updated or incremented the version number even thought the overhead message did not change. Thus, at time T4 WCD1 wakes up from an "idle state" reads the OH VERSION NO. "10010111," compares the OH VERSION NO. to the WCD1 VERSION NO., determines the version numbers to not be equivalent, and remains awake to update existing information including WCD1 APM, WCD1 SPM, and WCD1 VERSION NO.

FIG. 8B illustrates reception of the forward communication links 710 and 720 as seen from WCD7. Specifically, FIG. 8B illustrates base station 410 updating the version number to correct a communication failure caused by a partial overhead message update. As discussed above, from time T0 to time T5 WCD7 moves from the first sector to the second sector and back to the first sector. In particular, at time T0 overhead message M1 is received by WCD7 including the version number "10010011," an APM set to "A," and an SPM set to "B." The existing overhead message information stored in WCD7 (i.e., WCD7 VERSION NO.) indicates a version number "10010011." Thus, at time T0 WCD7 wakes up from an "idle state" reads the OH VERSION NO. "10010011," compares the OH VERSION NO. to the WCD7 VERSION NO., determines the version numbers to be equivalent, and returns to an idle state without updating WCD1 APM, WCD1 SPM, or WCD1 VERSION NO.

At time T1 WCD7 moves from the first sector to the second sector. At time T2 overhead message M2 is received by WCD7 including the version number "10001111," an APM set to "Z," and an SPM set to "W." The existing overhead message information stored in WCD7 (i.e., WCD7 VERSION NO.) indicates a version number "10010011." Thus, at time T3 WCD7 wakes up from an "idle state" reads the OH VERSION NO. "100001111," compares the OH VERSION NO. to the WCD7 VERSION NO., determines the version numbers to not be equivalent, and remains awake in order to update WCD7 APM, WCD7 SPM, an WCD7 VERSION NO. However, at time T3, prior to updating WCD7 SPM and WCD7 VERSION NO., WCD7 moves from the second sector back to the first sector. Thus, at time T3, the existing overhead message information stored in WCD7 (i.e., WCD7 VERSION NO.) indicates a version number "10010011," the WCD7 APM is set to "Z," and the WCD7 SPM is set to "B."

Advantageously, base station BTS 410 updates or increments the version number regardless of whether the overhead message changed in order to prevent the scenario discussed in FIG. 6B. In this case, BTS 410 determines the control channel occupancy and reverse noise generated by wireless communication devices. BTS 410 then compares the control channel occupancy to an occupancy threshold and the reverse noise to a noise threshold. Likewise, the reverse noise may be compared to a reverse noise threshold value resulting in the reverse noise being measured in or converted to compatible units with the reverse noise threshold. BTS 410 then updates the version number because the control channel occupancy fails to exceed the occupancy threshold and the reverse noise exceeds the reverse noise threshold.

At time T4, overhead message M1 is received by WCD7 including the version number "10010111," an APM set to "A," and an SPM set to "B." Thus, at time T4 WCD7 wakes up from an "idle state" reads the OH VERSION NO. "10010011," compares the OH VERSION NO. to the WCD7 VERSION NO., determines the version numbers to not be equivalent, and remains awake to update existing information including WCD7 APM, WCD7 SPM, and WCD7 VERSION NO. Accordingly, at time T5 and beyond WCD7 is has the correct APM/SPM combination to communicate with the base station BTS 410.

Figure 9:
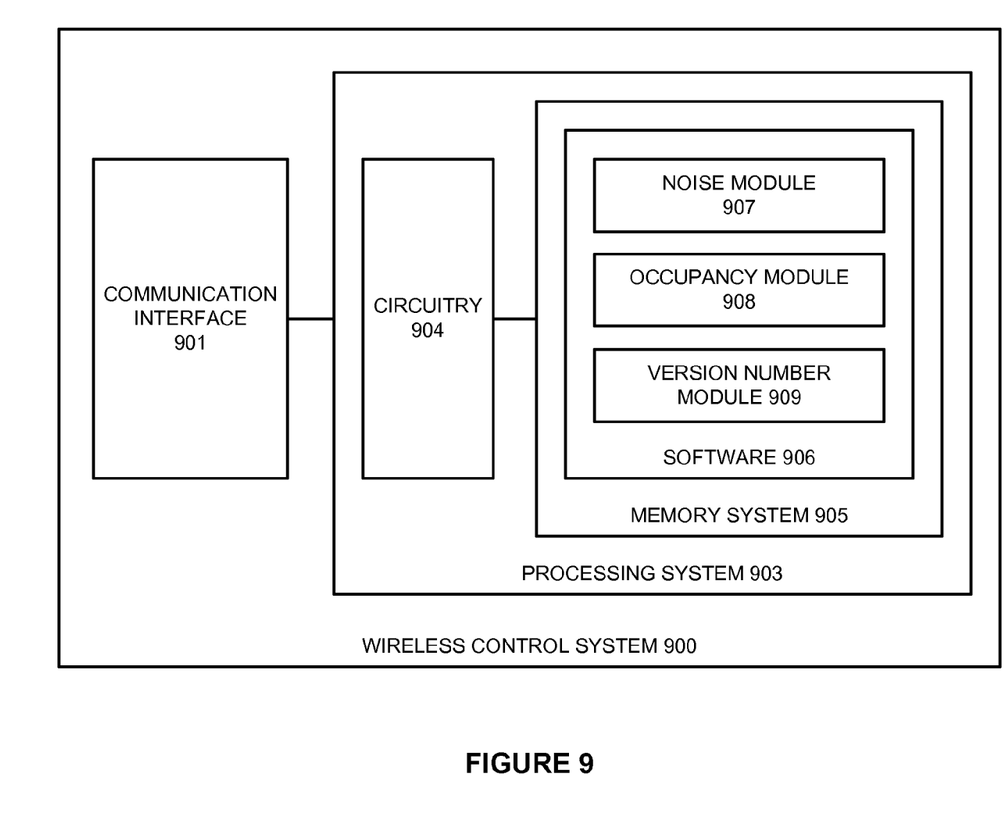
FIG. 9 illustrates a wireless control system.

FIG. 9 illustrates a wireless control system 900. Wireless control system 900 provides an example of wireless control system 110, base station BTS 410, and base station BTS 420, although these systems and base stations may user alternative configurations. Wireless control system 900 comprises communication interface 901, network interface 902, and processing system 903. Processing system 903 is linked to access interface 901 and network interface 902. Processing system 903 includes processing circuitry 904 and memory system 905 that stores operating software 906. Operating software 906 comprises software modules 907-909.

Communication interface 901 includes a network router and gateway equipment for communicating with access and/or communication networks of a wireless communication provider, such as with communication network 120. Communication interface 901 exchanges user communications and overhead communications with a communication network of a wireless communication system over a link to provide communication services, omitted for clarity. The link could use various protocols or communication formats as described herein, including combinations, variations, or improvements thereof.

Communication interface 901 may also include transceiver equipment such as, for example, transceiver 105, and antenna elements for exchanging user communications and overhead communications with wireless communication devices in a mobile communication system. In some examples, two or more links are used to communicate with a single mobile communication device using different spreading codes. In this case, communication interface 901 receives command and control information and instructions from processing system 903 for controlling transmission power of the transceiver equipment and the operations of wireless communication devices over the links, as well as for coordinating handoffs of mobile communication devices between other wireless access nodes or base stations. The links could each use various protocols or communication formats as described herein, including combinations, variations, or improvements thereof.

Processing circuitry 904 comprises microprocessor and other circuitry that retrieves and executes operating software 906 from memory system 905. Processing circuitry 904 may comprise single device or be distributed across multiple devices—including devices in different geographic areas. Processing circuitry 904 may be embedded in various types of equipment.

Memory system 905 comprises a non-transitory storage medium, such as a disk drive, flash drive, data storage circuitry, or some other memory apparatus. Memory system 905 may comprise single device or be distributed across multiple devices—including devices in different geographic areas. Memory system 905 may be embedded in various types of equipment.

Operating software 906 comprises computer programs, firmware, or some other form of machine-readable processing instructions. Operating software 906 may include an operating system, utilities, drivers, network interfaces, applications, or some other type of software. In this example, operating software 906 also comprises software modules 907-909, although software 906 could have alternative configurations.

When executed by processing circuitry 904, operating software 906 directs processing system 903 to operate as described herein to update overhead message version numbers. In particular, noise module 907 determines reverse noise and compares the reverse noise to a reverse noise threshold. Occupancy module 508 determines control channel occupancy and compares the control channel occupancy to an occupancy threshold. Version number module 909 updates a version number associated with an overhead message if the control channel occupancy fails to exceed the occupancy threshold and the reverse noise exceeds the reverse noise threshold.

Referring back to FIG. 1, wireless communication devices 111 and 112 comprise Radio Frequency (RF) communication circuitry and an antenna. The RF communication circuitry typically includes an amplifier, filter, modulator, and signal processing circuitry. Wireless communication devices 111 and 112 may also include a user interface, memory device, software, processing circuitry, or some other communication components. Wireless communication devices 111 and 1123 could be telephones, transceivers, mobile phones, cellular phones, smartphones, computers, personal digital assistants (PDA), e-books, game consoles, mobile Internet devices, wireless network interface cards, media players, or some other wireless communication apparatus—including combinations thereof. Wireless network protocols that may be utilized by wireless communication devices 111 and 112 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 111 and 112 and wireless control system 110.

Wireless control system 110 comprises RF communication circuitry and an antenna. Some examples of wireless control system 110 includes a base transceiver station (BTS), base station controller (BSC), radio base station (RBS), Node B, enhanced Node B (eNode B), and others. The RF communication circuitry typically includes amplifiers, filters, RF modulators, and signal processing circuitry and software. Wireless control system 110 may also comprise routers, servers, memory devices, software, processing circuitry, cabling, power supplies, network communication interfaces, structural supports. Wireless network protocols that may be utilized by wireless control system 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless links 101 and 102 use the air or space as the transport media. Wireless links 101 and 102 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication links 106 and 107 use metal, glass, air, space, or some other material as the transport media. Communication links 106 and 107 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 106 and 107 could be a direct link or may include intermediate networks, systems, or devices.

Communication network 120 may also comprise routers, servers, memory devices, software, processing circuitry, cabling, power supplies, network communication interfaces, and structural supports.

Figure 10:
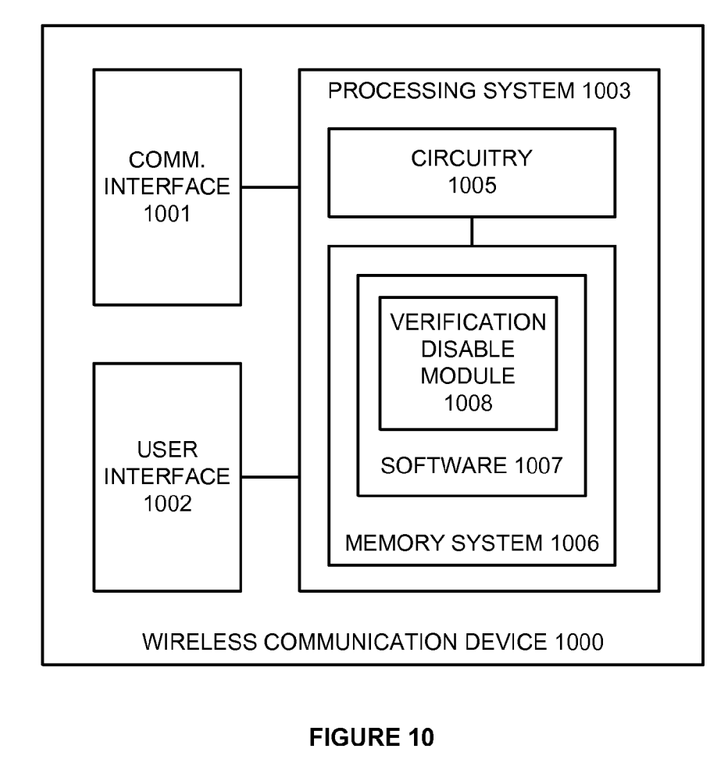
FIG. 10 illustrates a wireless communication device.

FIG. 10 illustrates a wireless communication device 1000. Wireless communication device 1000 is an example of wireless communication devices 111 and 112, and wireless communication devices WCD1-WCD7 of FIG. 4, although wireless communication devices 111 and 112, and wireless communication devices WCD1-WCD7 of FIG. 4 may use alternative configurations. Wireless communication device 1000 comprises communication interface 1001, user interface 1002, and processing system 1003. Processing system 1003 is linked to communication interface 1001 and user interface 1002. Processing system 1003 includes processing circuitry 1005 and memory system 1006 that stores operating software 1007. Operating software 1007 includes verification disable module 1008.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory system 1006. Memory system 1006 comprises a disk drive, flash drive, data storage circuitry, or some other memory apparatus. Operating software 1007 comprises computer programs, firmware, or some other form of machine-readable processing instructions. Operating software 1007 may include an operating system, utilities, drivers, network interfaces, applications, or some other type of software.

When executed by circuitry 1005, operating software 1007 directs processing system 1003 to operate wireless communication device 1000 as described herein to update overhead message version numbers. In particular, verification disable module 1008 determines if an idle handoff condition occurs. If so, verification disable module 1008 disables version number verification as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to control version numbers associated with overhead messages, the method comprising:
  transmitting an overhead message including a version number associated with a first version of the overhead message;
  determining control channel occupancy and reverse noise generated by a plurality of wireless communication devices;
  comparing the control channel occupancy to an occupancy threshold and the reverse noise to a reverse noise threshold;
  updating the version number resulting in an updated version number if a criteria is met, wherein the version number comprises a modulo count and updating the version number comprises incrementing a modulo counter, and wherein the criteria is met if the control channel occupancy fails to exceed the occupancy threshold and the reverse noise exceeds the reverse noise threshold; and
  transmitting the overhead message including the updated version number if the criteria is met.

2. The method of claim 1 wherein the overhead message is not updated and both the version number and the updated version number are associated with the first version of the overhead message.

3. The method of claim 1 wherein overhead message comprises communication data used by a wireless communication device of the plurality of wireless communication devices to access a wireless communication network.

4. The method of claim 3 wherein the version number comprises an update indication that directs the wireless communication device to update existing communication data within the wireless communication device with the communication data contained within the overhead message.

5. The method of claim 4 further comprising:
receiving the overhead message including the version number at the wireless communication device;
comparing the version number to an existing version number associated with the existing communication data and determining that the version number is equivalent to the existing version number;
receiving the overhead message including the updated version number at the wireless communication device;
comparing the updated version number to the existing version number and determining that the updated version number is not equivalent to the existing version number; and
updating the overhead message in the wireless communication device by replacing the existing version number with the updated version number and the existing communication data with the communication data contained within the overhead message.

6. The method of claim 3 further comprising detecting an idle handoff condition resulting from the wireless communication device moving from a first sector to a second sector while in an idle state.

7. The method of claim 6 wherein the idle handoff condition comprises an update indication that directs the wireless communication device to update existing communication data within the wireless communication device with the communication data contained within the overhead message.

8. The method of claim 1 wherein the overhead message comprises a sector parameter message and the version number comprises a signature indicating a version of the sector parameter message.

9. The method of claim 1 wherein the overhead message comprises an access parameter message and the version number comprises a signature indicating a version of the access parameter message.

10. The method of claim 1 wherein the overhead message comprises a sector parameter message and an access parameter message and the version number represents the sector parameter message and the access parameter message.

11. A wireless communication system to control version numbers associated with overhead messages, the system comprising:
a communication transceiver configured to transmit an overhead message including a version number associated with a first version of the overhead message;
a processing system configured to determine control channel occupancy and reverse noise generated by a plurality of wireless communication devices, compare the control channel occupancy to an occupancy threshold and the reverse noise to a reverse noise threshold, and update the version number resulting in an updated version number if a criteria is met, wherein the version number comprises a modulo count and updating the version number comprises incrementing a modulo counter, and wherein the criteria is met if the control channel occupancy fails to exceed the occupancy threshold and the reverse noise exceeds the reverse noise threshold; and
the communication transceiver configured to transmit the overhead message including the updated version number if the criteria is met.

12. The wireless communication system of claim 11 wherein the overhead message is not updated and both the version number and the updated version number are associated with the first version of the overhead message.

13. The wireless communication system of claim 11 wherein overhead message comprises communication data used by a wireless communication device of the plurality of wireless communication devices to access a wireless communication network.

14. The wireless communication system of claim 13 wherein the version number comprises an update indication that directs the wireless communication device to update existing communication data within the wireless communication device with the communication data contained within the overhead message.

15. The wireless communication system of claim 14 further comprising the wireless communication device configured to receive the overhead message including the version number, comparing the version number to an existing version number associated with the existing communication data and determine that the version number is equivalent to the existing version number, receive the overhead message including the updated version number, compare the updated version number to the existing version number and determine that the updated version number is not equivalent to the existing version number, and update the overhead message by replacing the existing version number with the updated version number and the existing communication data with the communication data contained within the overhead message.

16. The wireless communication system of claim 13 wherein the wireless communication device is further configured to detect an idle handoff condition resulting from the wireless communication device moving from a first sector to a second sector while in an idle state.

17. The wireless communication system of claim 16 wherein the idle handoff condition comprises an update indication that directs the wireless communication device to update existing communication data within the wireless communication device with the communication data contained within the overhead message.

18. The wireless communication system of claim 11 wherein the overhead message comprises a sector parameter message and the version number comprises a signature indicating a version of the sector parameter message.

19. The wireless communication system of claim 11 wherein the overhead message comprises an access parameter message and the version number comprises a signature indicating a version of the access parameter message.

20. The wireless communication system of claim 11 wherein the overhead message comprises a sector parameter message and an access parameter message and the version number represents the sector parameter message and the access parameter message.

* * * * *